(12) United States Patent
Waters et al.

(10) Patent No.: US 8,188,622 B1
(45) Date of Patent: May 29, 2012

(54) TUNABLE RESONANT FREQUENCY KINETIC ENERGY HARVESTER

(75) Inventors: Richard Waters, San Diego, CA (US); Mark Fralick, San Diego, CA (US); Hugo Jazo, San Diego, CA (US); Brad Chisum, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 344 days.

(21) Appl. No.: 12/616,904

(22) Filed: Nov. 12, 2009

(51) Int. Cl.
*H02K 33/00* (2006.01)
*H02K 35/00* (2006.01)

(52) U.S. Cl. ......... 310/15; 310/12.03; 310/36; 310/319; 310/338; 310/339; 290/1 R; 324/207.15

(58) Field of Classification Search ............... 310/15, 310/319, 338, 339, 36, 68 R; 290/1 R, 53; 324/207.15; *H02K 33/00, 35/00*
See application file for complete search history.

(56) References Cited

U.S. PATENT DOCUMENTS

| | | | | |
|---|---|---|---|---|
| 1,909,414 | A | * | 5/1933 | Matte ............................... 310/25 |
| 2,945,192 | A | * | 7/1960 | Szymanski ..................... 332/139 |
| 3,202,847 | A | * | 8/1965 | Erickson ........................ 310/14 |
| 6,768,230 | B2 | | 7/2004 | Cheung et al. |
| 6,936,937 | B2 | | 8/2005 | Tu et al. |
| 6,984,902 | B1 | | 1/2006 | Huang et al. |
| 7,309,934 | B2 | | 12/2007 | Tu et al. |
| 7,501,726 | B1 | | 3/2009 | Waters et al. |
| 7,569,952 | B1 | | 8/2009 | Bono et al. |
| 7,586,220 | B2 | | 9/2009 | Roberts |
| 7,692,340 | B2 | * | 4/2010 | Waters et al. ................... 310/36 |
| 7,844,145 | B1 | * | 11/2010 | Waters ........................... 385/24 |
| 7,948,124 | B1 | * | 5/2011 | Waters et al. ................... 310/36 |
| 2003/0173725 | A1 | * | 9/2003 | Noe ......................... 267/140.14 |
| 2005/0162105 | A1 | * | 7/2005 | Yamasaki et al. ............ 318/114 |
| 2007/0273156 | A1 | * | 11/2007 | Miyajima et al. .............. 290/53 |
| 2008/0001484 | A1 | * | 1/2008 | Fuller et al. .................... 310/15 |
| 2008/0036307 | A1 | * | 2/2008 | Lu et al. .......................... 310/15 |
| 2008/0073981 | A1 | * | 3/2008 | Springer et al. ............... 310/12 |
| 2008/0074083 | A1 | * | 3/2008 | Yarger et al. ................. 320/137 |
| 2008/0116856 | A1 | | 5/2008 | Roberts et al. |
| 2008/0129147 | A1 | * | 6/2008 | Thiesen et al. ............... 310/319 |
| 2008/0174120 | A1 | * | 7/2008 | Gardner et al. .............. 290/1 C |
| 2008/0204005 | A1 | * | 8/2008 | Wang ...................... 324/207.15 |
| 2008/0246346 | A1 | | 10/2008 | Harris et al. |
| 2008/0265692 | A1 | * | 10/2008 | Roberts .......................... 310/15 |
| 2008/0278008 | A1 | | 11/2008 | Roberts et al. |

OTHER PUBLICATIONS

S. P. Beeby, R. N. Torah, M. J. Tudor, P. Glynne-Jones, T. O'Donnell, C. R. Saha, and S. Roy; A micro electromagnetic generator for vibration energy harvesting; IOP Publishing Ltd, J. Micromech. Microeng. 17, pp. 1257-1265; Jun. 5, 2007. U.S. Appl. No. 12/360,892, filed Jan. 28, 2009, Titled, "An Apparatus for Generating Power Responsive to Mechanical Vibration."

* cited by examiner

*Primary Examiner* — John K Kim
(74) *Attorney, Agent, or Firm* — Kyle Eppele; J. Eric Anderson

(57) ABSTRACT

An energy harvester comprising: a substrate; two magnets coupled to the substrate in close proximity to each other with like magnetic poles facing each other creating a flux gap; a coil coupled to the substrate and disposed within the flux gap, wherein the coil and the magnets are coupled to the substrate such that substrate acceleration causes relative elastic motion between the magnets and the coil thereby exposing the coil to a changing magnetic flux; and a resonant frequency tuner coupled to the substrate and configured to adjust the resonant frequency between the coil and the magnets.

13 Claims, 8 Drawing Sheets

TUNABLE RESONANT FREQUENCY KINETIC ENERGY HARVESTER

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 99740.

BACKGROUND OF THE INVENTION

This invention relates generally to energy harvesting and more particularly to an electromagnetic power generator for converting kinetic energy into electrical power. Kinetic energy harvesting is in area of much interest due to the ability to generate useful electrical energy by extracting mechanical energy in the form of vibrations. As the efficiency of these devices improves and the ability to produce increased useful electrical power increases, the need for batteries is reduced or eliminated in many applications. Numerous transducers have been developed to convert mechanical energy into electrical energy including piezo-electric and electro-magnetic. For electro-magnetic devices, a time varying magnetic field (flux) created by a vibrational source across the surface of a coil induces a potential and therefore current across the windings of the coil. The greater the flux density and flux gradient the larger the potential across the windings of the coil.

SUMMARY

A vibrational energy harvesting apparatus is disclosed herein that comprises a substrate; two magnets coupled to the substrate in close proximity to each other with like magnetic poles facing each other creating a flux gap; a coil coupled to the substrate and disposed within the flux gap, wherein the coil and the magnets are coupled to the substrate such that substrate acceleration causes relative elastic motion between the magnets and the coil thereby exposing the coil to a changing magnetic flux; and a resonant frequency tuner coupled to the substrate and configured to adjust the resonant frequency between the coil and the magnets.

The vibrational energy harvesting apparatus may be constructed as a micro-electro-mechanical system (MEMS) power generator comprising: a substrate; two magnets, each magnet having an opposing face, wherein the magnets are rigidly coupled to the substrate such that the opposing faces are substantially parallel to each other with like magnetic poles facing each other with a space there-between so as to form a steep flux gradient region in and around the space between the opposing faces; an elastic member having first and second ends, wherein the second end is coupled to the substrate; a proof mass coupled to the first end of the elastic member such that the proof mass is positioned within the steep flux gradient region and is configured to move with respect to the magnets responsive to substrate acceleration; a coil coupled to the proof mass so that the coil is exposed to a changing magnetic flux arising from motion of the proof mass with respect to the magnets; and a resonant frequency tuner operatively coupled to the elastic member.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views. The elements in the various figures are illustrative in nature and are not drawn to scale.

FIG. 5b shows a perspective view of the coil, proof-mass, and elastic members of the tunable energy harvester shown in FIG. 5a.

DETAILED DESCRIPTION OF EMBODIMENTS

Figure 1A:
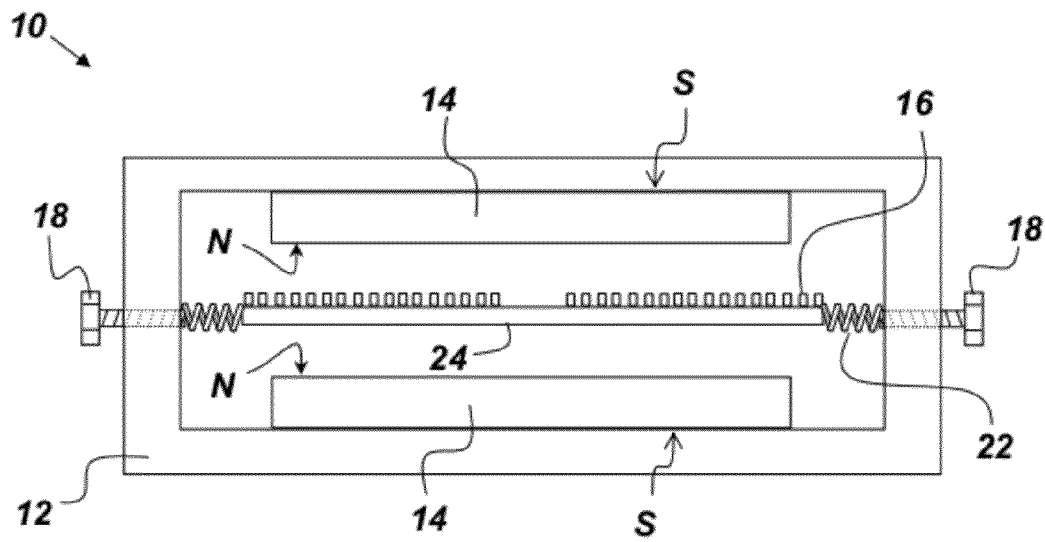
FIG. 1a is a cross-sectional view of one embodiment of the tunable energy harvester.
Figure 1B:
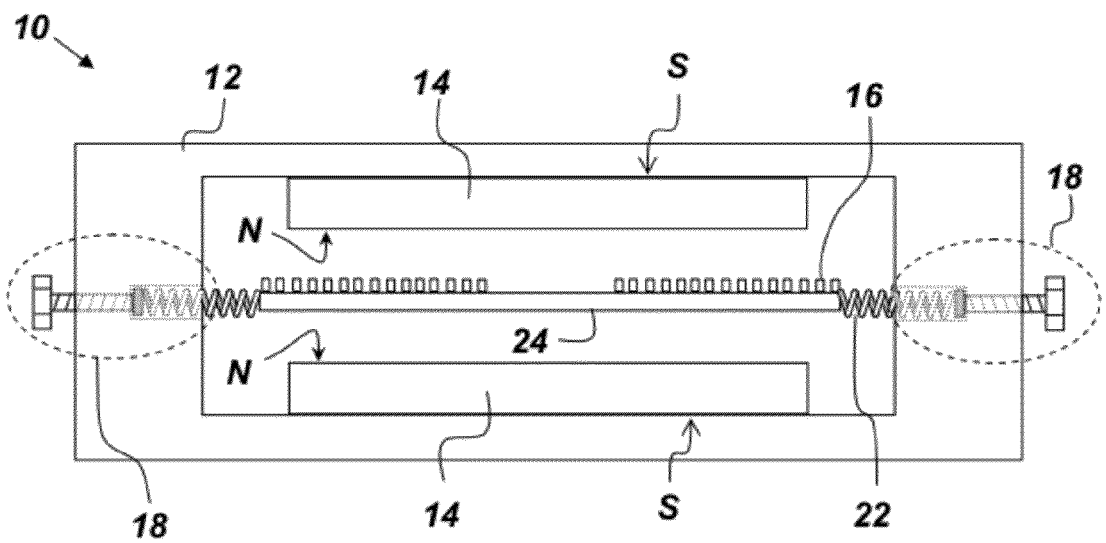
FIG. 1b is a cross-sectional view of another embodiment of the tunable energy harvester.

FIGS. 1a and 1b depict different embodiments of a tunable resonant frequency kinetic energy harvester 10. The tunable energy harvester 10 may be manufactured according to the fabrication method disclosed in detail in U.S. Pat. No. 7,501,726 titled, "Micro-Electro-Mechanical System (MEMS) and Apparatus for Generating Power Responsive to Mechanical Vibration," which is incorporated by reference herein in its entirety for its teachings. As can be seen in FIG. 1a, the tunable energy harvester 10 comprises a substrate 12, at least two magnets 14, a coil 16, and a resonant frequency tuner 18.

Figure 2:
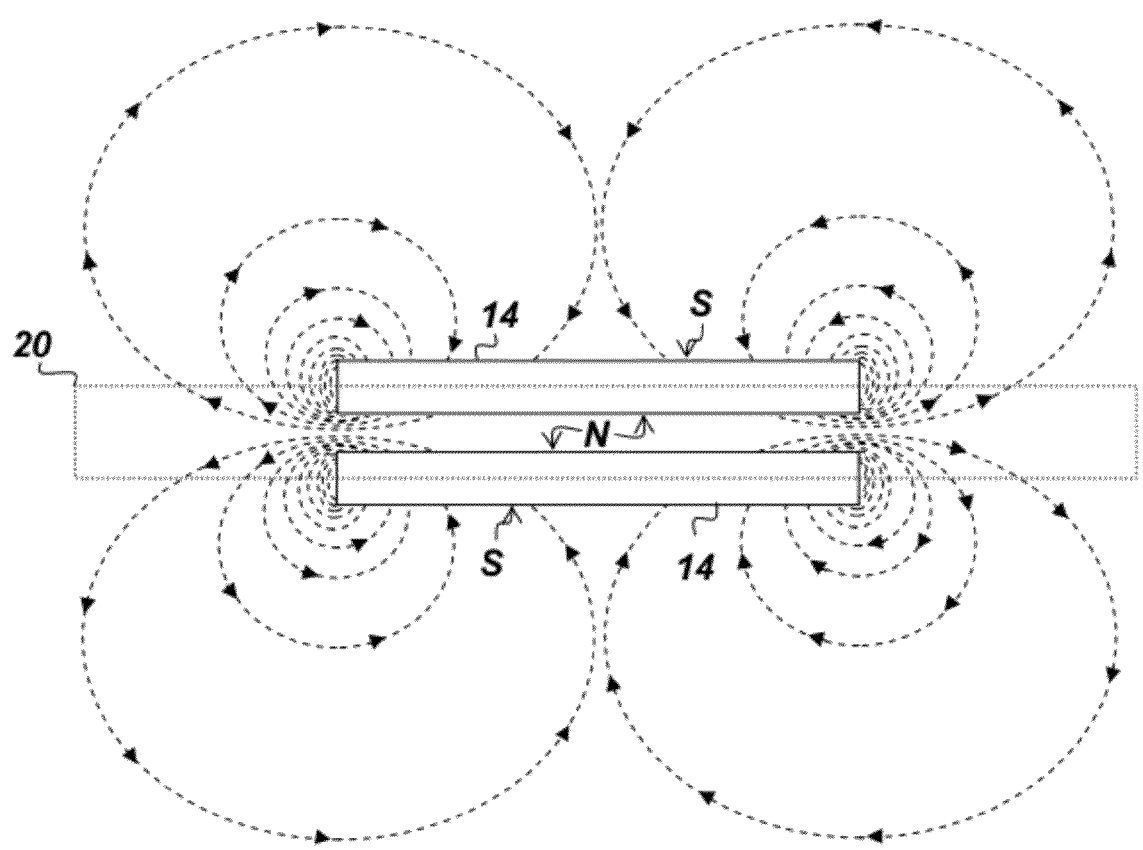
FIG. 2 is a diagram illustrating magnetic field lines generated by two magnets.

The two magnets 14 may be coupled to the substrate 12 in close proximity to each other with like magnetic poles facing each other creating a flux gap 20, as shown in and described in reference to FIG. 2. Suitable examples of the magnets 14 include, but are not limited to, Neodymium permanent magnets, electromagnets, or any other material capable of generating a magnetic field. The magnets 14 may be any desired size or shape.

The coil 16 may be fabricated of any conductive material on the macro or micro scale. The coil 16 is coupled to the substrate 12 and disposed within the flux gap 20. The coil 16 and the magnets 14 are coupled to the substrate 12 such that acceleration of the substrate 12 causes relative elastic motion between the magnets 14 and the coil 16 thereby exposing the coil 16 to a changing magnetic flux. In the embodiment of the tunable energy harvester 10 depicted in FIGS. 1a and 1b, the magnets 14 are firmly coupled to the substrate 12 and the coil 16 is coupled to the substrate 12 via elastic members 22, but it is to be understood that this is only one of many possible embodiments of the tunable energy harvester 10. Any configuration that allows relative motion between the coil 16 and the magnets 14 in response to substrate 12 acceleration is acceptable.

In the embodiment of the tunable energy harvester 10 shown in FIG. 1a, the elastic members 22 are depicted as coil tension springs, and the resonant frequency tuner 18 comprises set screws wherein the outer diameter of the shank of each set screw is slightly smaller than the internal diameter of the corresponding coil spring. In this embodiment, the resonant frequency between the coil 16 and the magnets 14 can be adjusted by extending the shank of a given set screw into the cylindrical void in the corresponding coil spring, thus effectively changing the length of the spring and, by extension, the resonant frequency of the tunable energy harvester 10. FIG. 1b depicts another embodiment of the tunable energy harvester 10 wherein the elastic members 22 are compression springs and the resonant frequency tuner 18 is an apparatus for adjusting the tension of the springs. Although both FIGS. 1a and 1b show the elastic members 22 as springs, it is to be understood that the elastic members 22 may be any element that is capable of elastic deformation. Suitable forms of the elastic members 22 include, but are not limited to, torsional, compression, leaf, volute, flat, tension, cantilever, or coil springs. The elastic members 22 may also be compliant regions of the substrate 12. Changing the tension in the elastic members 22, either mechanically or electromagnetically, will change the resonant frequency of the tunable energy harvester 10.

FIG. 2 is an edge view of two circular magnets 14 in close proximity to each other. Both magnets 14 have a North face and a South face. In FIG. 2, the North faces oppose each other, however, it is to be understood that the flux gap 20 may also be created with South Poles facing each other. With the magnets 14 in close proximity to one another and with like magnetic poles facing each other a flux gap 20 is created. In reference to the orientation of the magnets 14 shown in FIG. 2, the flux gap 20 may be defined as the region between the midpoints of the magnets 14 in the vertical direction and then laterally out to infinity. Although the box showing the flux gap 20 in FIG. 2 is shown with lateral boundaries, it is to be understood that this was done for illustration purposes only and that the lateral boundaries of the flux gap 20 extend to infinity. As can be seen in FIG. 2, there are regions of high flux density in the flux gap 20, particularly around the edges of the magnets 14.

Referring back to FIGS. 1a and 1b, the tunable energy harvester 10 may optionally further comprise a proof-mass 24 to support the coil 16. As shown in FIGS. 1a and 1b, the proof-mass 24 may be elastically coupled to the substrate 12 in such a way as to allow the coil 16 to vibrate within the flux gap 20 created by the magnets 14, which in this embodiment are rigidly coupled to the substrate 12. The proof-mass 24 may be any desired size, shape, or mass. It is to be understood that the tunable energy harvester 10 is not limited to embodiments where the magnets 14 are rigidly coupled to the substrate 12, but any embodiment is suitable that allows for relative motion between the coil 16 and one or both of the magnets 14 in response to acceleration of the substrate 12.

Figure 3:
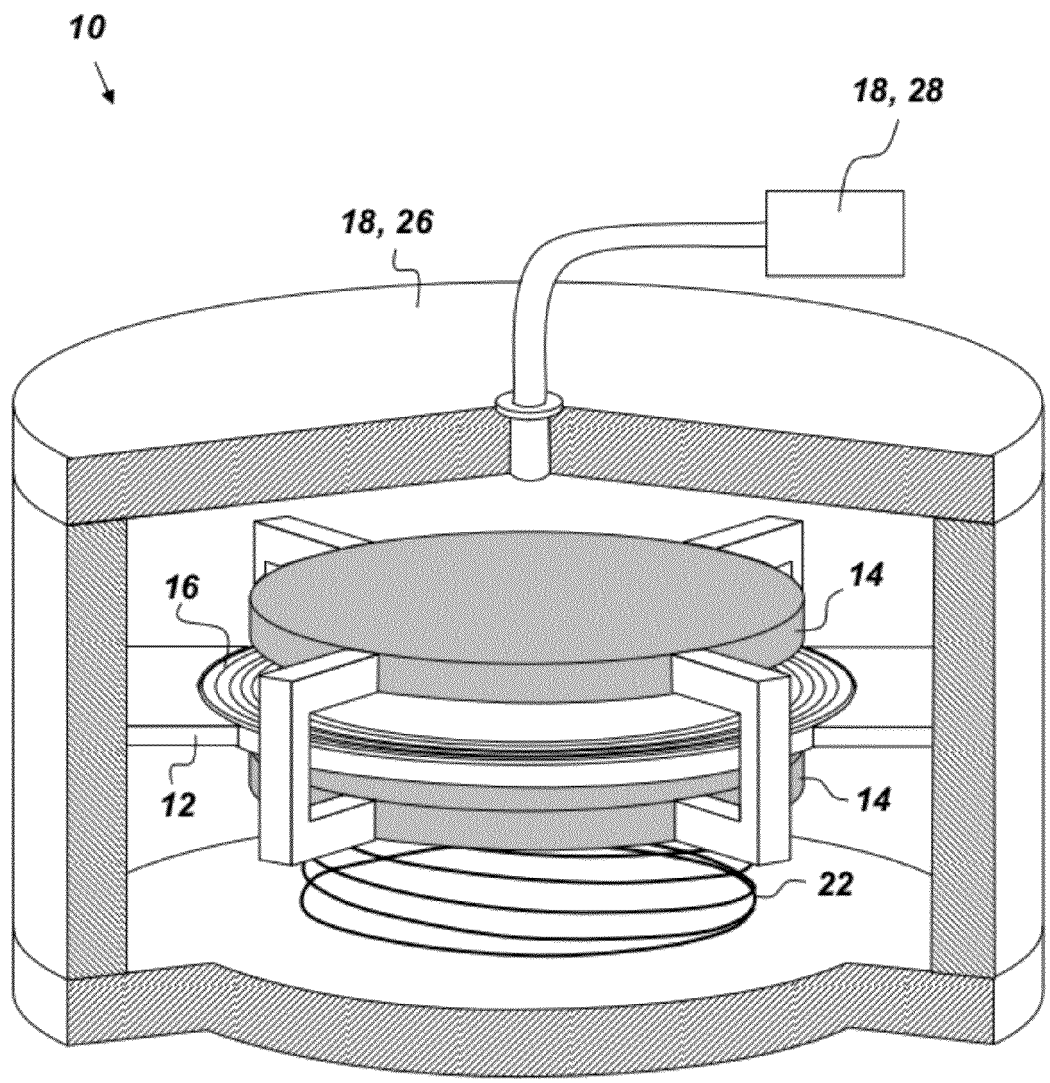
FIG. 3 is a perspective view of an embodiment of the tunable energy harvester.

FIG. 3 shows an alternative embodiment of the tunable energy harvester 10 where the resonant frequency tuner 18 comprises a hermetically-sealed enclosure 26 filled with a compressible gas, not shown. The enclosure 26 may be made of any desired material capable of containing the gas. The enclosure 26 may also be made out of the same material as the substrate 12. The resonant frequency tuner 18 in this embodiment also comprises a gas pressure adjuster 28, which is coupled to the enclosure 26 and configured to adjust the damping of the tunable energy harvester 10 by adjusting the pressure of the gas within the enclosure 26. The gas pressure adjuster 28 may be, but is not limited to, a pressure valve coupled to a gas supply, a mechanical enclosure-volume adjusting device, or any apparatus capable of adjusting the pressure within the enclosure 26. In the embodiment of the tunable energy harvester 10 shown in FIG. 3, the coil 16 and the magnets 14 are enclosed within the enclosure 26. Also note, in this embodiment the coil 16 is rigidly mounted to the substrate 12 and the magnets 14 are rigidly coupled to each other and elastically coupled to the substrate 12 via a single elastic member 22.

Figure 4A:
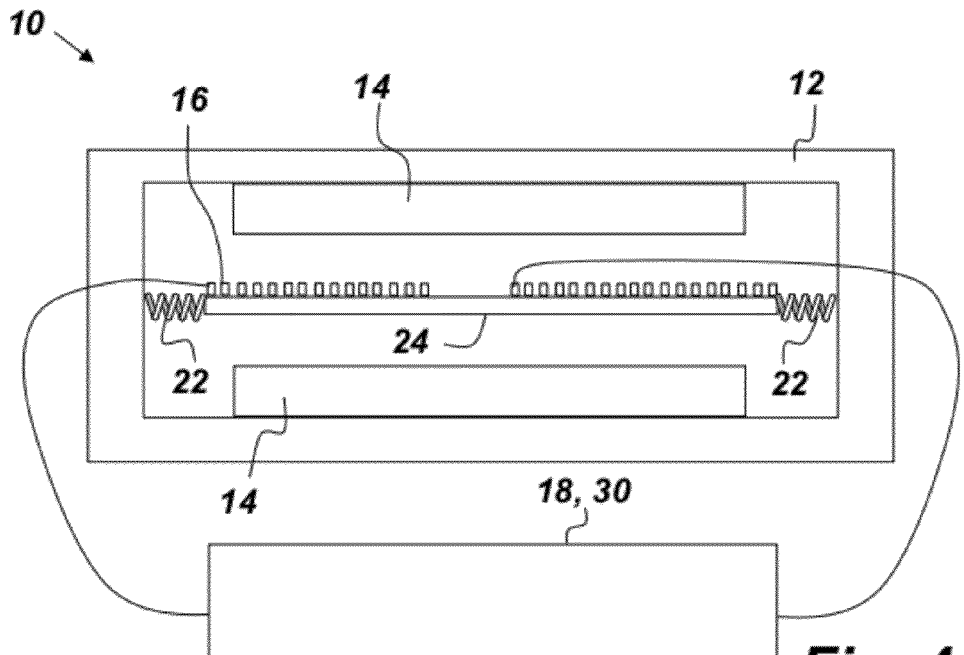
FIG. 4a is a cross-sectional view of another embodiment of the tunable energy harvester.
Figure 4B:
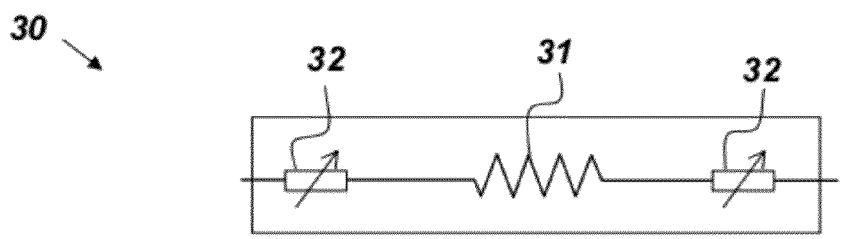
FIG. 4b is circuit diagram showing an example embodiment of a resonant frequency tuner.
Figure 4C:
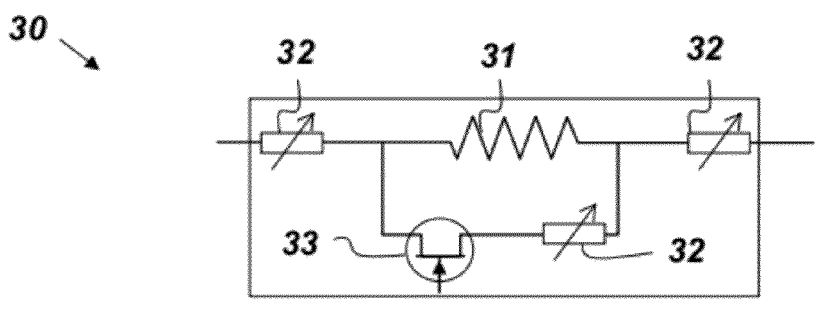
FIG. 4c is circuit diagram showing another example embodiment of a resonant frequency tuner.

FIGS. 4a-4c illustrate another embodiment of the tunable energy harvester 10, wherein the resonant frequency tuner 18 is a circuit 30. In the example embodiment shown in FIG. 4b, the circuit 30 is a tunable load-matching circuit comprising a load 31 and two variable elements 32. The circuit 30, as depicted in FIG. 4b, is configured to alter an electrical load external to the coil 16 by tuning the impedance of the load-matching circuit 30, thereby altering the resonant frequency of the tunable energy harvester 10. Suitable examples of the variable elements 32 include, but are not limited to, resistors, capacitors, and inductors. It is to be understood that FIG. 4b shows just one possible embodiment of the circuit 30 and that any circuit capable of controllably altering the impedance of the circuit 30 is suitable regardless of whether resistors, capacitors, inductors, or any combination thereof are employed.

FIG. 4c shows another example embodiment of the circuit 30 comprising a load 31, several variable elements 32 and a switch 33, which varies the current through a switching load. A switching scheme may be employed to switch connection to the load 31 or to alternative loads, with some frequency and duty cycle. The frequency or duty cycle of the switching could then be tuned to alter the resonant frequency of the tunable energy harvester 10.

Figure 5A:
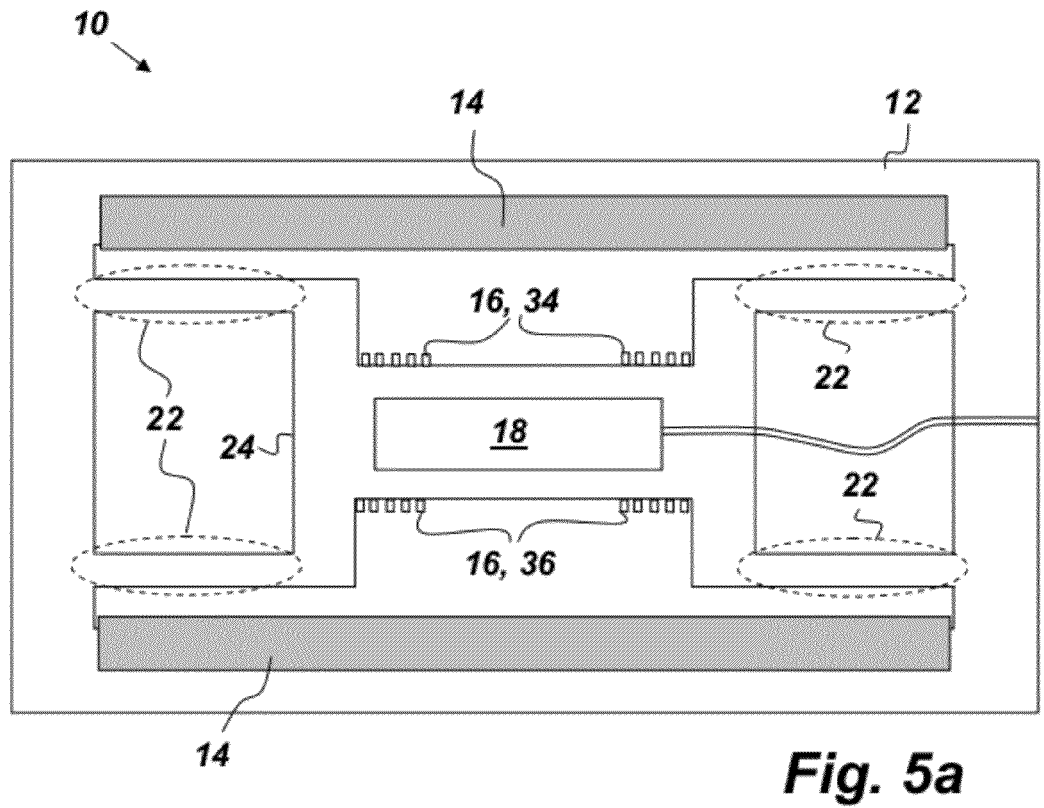
FIG. 5a shows a cross-sectional view of another embodiment of the tunable energy harvester.
Figure 5B:
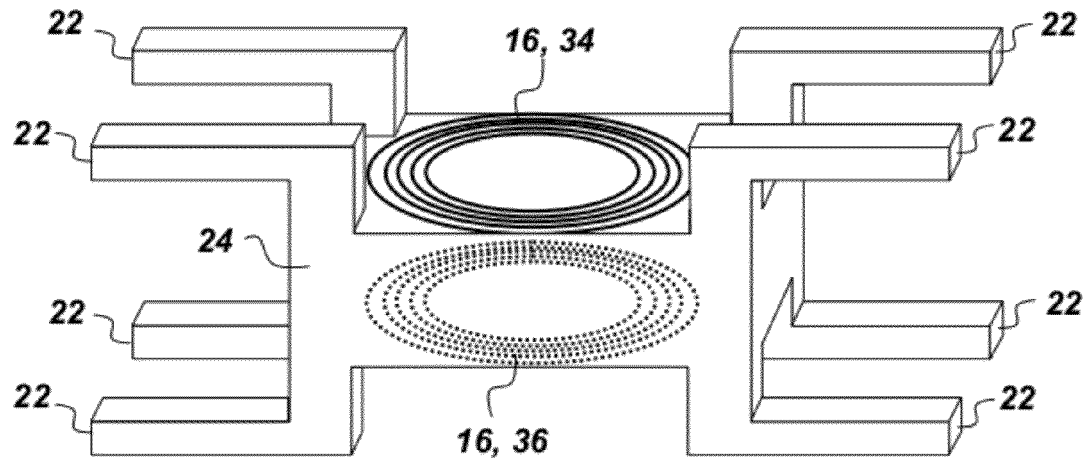

FIGS. 5a and 5b illustrate a micro-electro-mechanical system (MEMS) embodiment of the tunable energy harvester 10. In the embodiment of the tunable energy harvester 10 shown in FIGS. 5a-5b, the elastic members 22 are compliant regions of the substrate 12. In this embodiment, the coil 16 comprises a top coil 34 and a bottom coil 36, both situated within the flux gap 20 and mounted on top and bottom surfaces respectively of the proof-mass 24, which is fabricated of the same material as the substrate 12. In this embodiment, the resonant frequency tuner 18 comprises a proof-mass altering device that is configured to alter the mass of the proof-mass 24. This can be accomplished by adding or removing mass from the proof-mass 24. The resonant frequency tuner 18 shown in FIG. 5a comprises a cavity into which gas or fluid may be pumped to increase the mass of the proof-mass 24. To decrease the mass of the proof-mass 24, the fluid or gas may be removed from the cavity. FIG. 5a shows a perspective view of the proof-mass 24, the elastic members 22, and the top and bottom coils 34 and 36. FIGS. 5a and 5b also show that the proof-mass 24 may be recessed to allow the top and bottom coils 34 and 36 to be positioned approximately in a null of a magnetic field gradient created by the magnets 14. The top and bottom coils 34 and 36 may be wound in the same or in opposite directions. Another way to alter the mass of the proof-mass 24 is by adding or removing small weights that can be attached to the proof-mass 24.

Figure 6A:
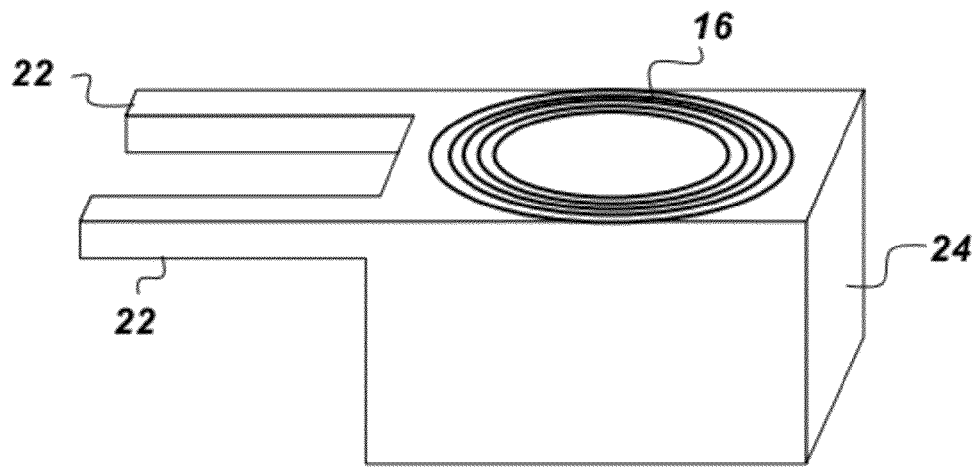
FIG. 6a is a perspective view of an alternative embodiment of the coil, proof-mass, and elastic members of the tunable energy harvester.
Figure 6B:
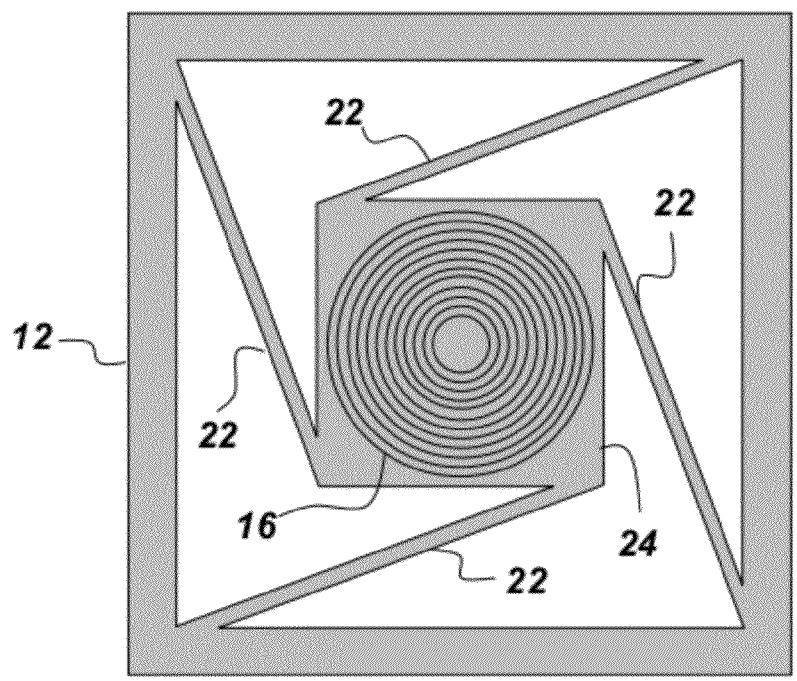
FIG. 6b is a top view of a MEMS embodiment of the coil, proof-mass, and elastic members of the tunable energy harvester.

FIGS. 6a and 6b illustrate alternative configurations for the proof-mass 24 and the elastic members 22. FIG. 6a shows the elastic members 22 as cantilevered beams and the proof-mass 24 as being supported at the end of the cantilevered beams.

FIG. 6b shows another monolithic embodiment of the proof-mass 24, the elastic members 22, and the substrate 12.

Figure 7:
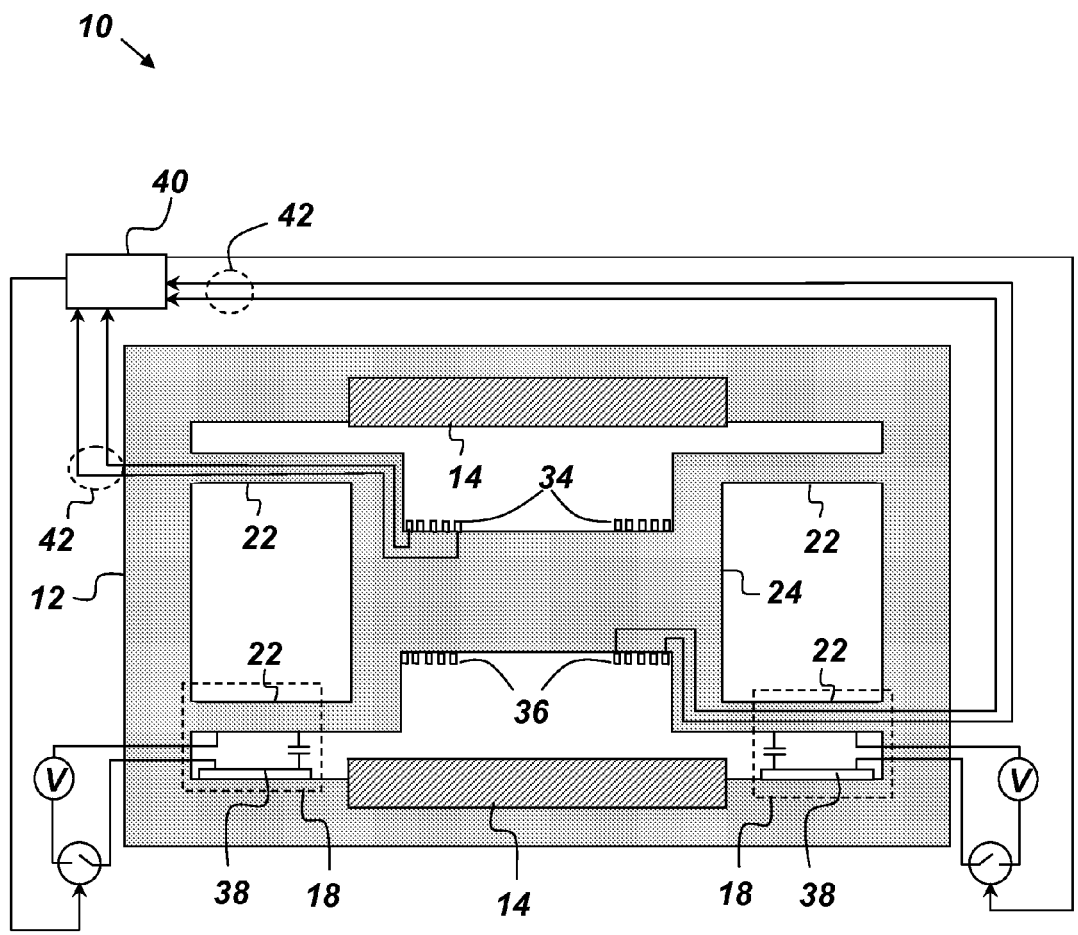
FIG. 7 is a cross-sectional view of another embodiment of the tunable energy harvester.

FIG. 7 shows another MEMS embodiment of the tunable energy harvester 10. In this embodiment, the elastic members 22 are made of a magnetic material and the resonant frequency tuner 18 comprises an electrode 38 integrated into the substrate 12 near at least one of the elastic members 22 such that when a potential is applied between a given elastic member 22 and the corresponding electrode 38 an electrostatic force is created which alters the tension of the elastic member 22. The tunable energy harvester 10 may also comprise a force feedback system 40 operatively coupled to the resonant frequency tuner 18 and a coil output 42, wherein the force feedback system 40 is configured to monitor the coil output 42 and adjust the tension in the elastic members 22 via the resonant frequency tuner 18 in real time such that at any given vibration frequency of the substrate 12, the proof mass 24 vibrates at a resonant frequency with respect to the magnets 14.

Figure 8:
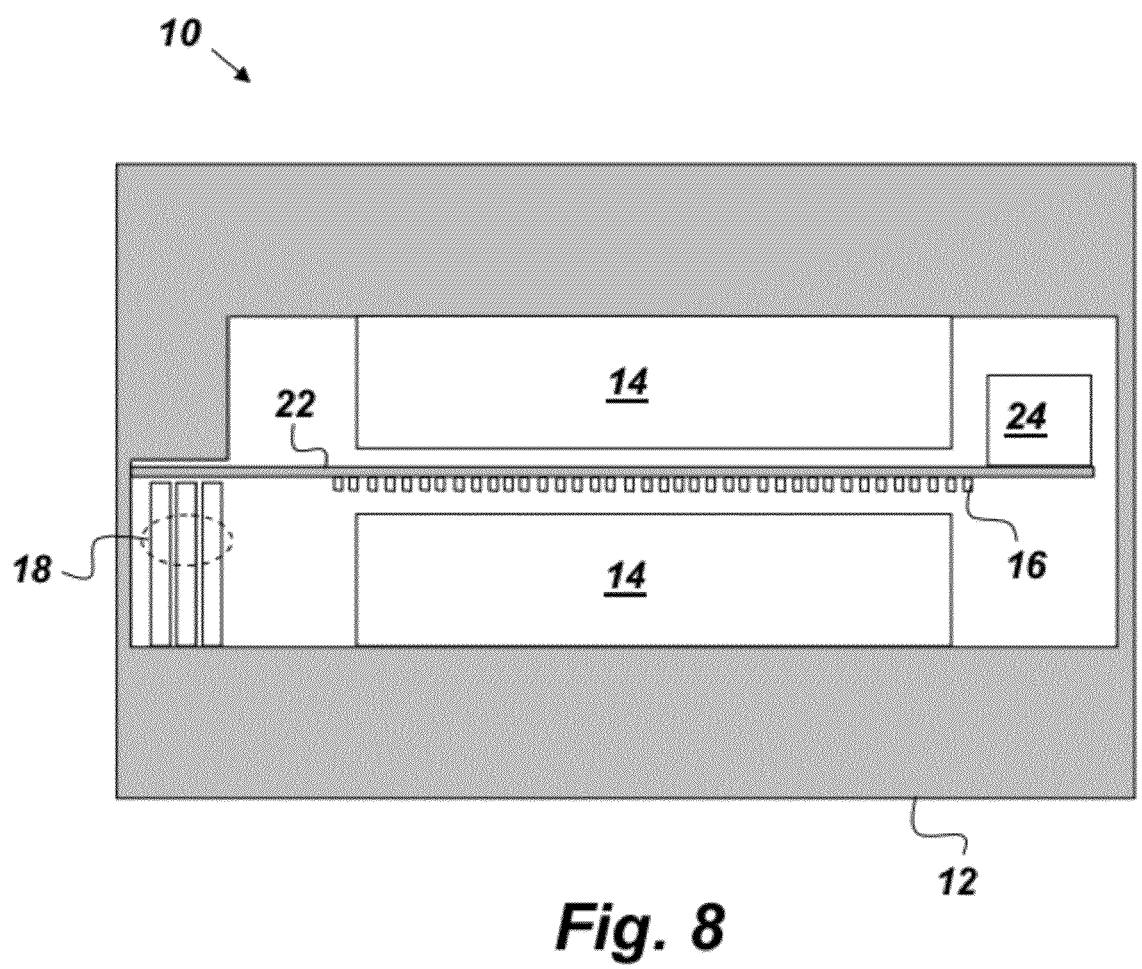
FIG. 8 is a cross-sectional view of another embodiment of the tunable energy harvester.

FIG. 8 shows another example embodiment of the tunable energy harvester 10 wherein the resonant frequency tuner 18 is a series of piezoelectric actuators positioned and configured to be able to anchor different sections of the elastic member 22 to the substrate 12 to effectively change the length of the elastic member 22. As can be observed, the resonant frequency tuner 18 can be any controlled means for adjusting the resonant frequency of the tunable energy harvester 10. For example, if the elastic members 22 are made of a magnetic material the resonant frequency tuner 18 may comprise a permanent magnet that is adjustably coupled to the substrate 12 such that the position of the permanent magnet with respect to at least one of the elastic members 22 is adjustable. In another example, in the embodiment where the elastic members 22 are made of a magnetic material, the resonant frequency tuner 18 may be permanent magnet positioning device for altering the position of a permanent magnet with respect to the elastic member 22 causing an attraction or repulsion of the elastic member 22, thereby causing change in spring tension and resonant frequency. In yet another example, the resonant frequency tuner 18 may be an electromagnet configured to create a magnetic field upon the elastic members 22 or proof-mass 24. Referring to this last embodiment, the magnetic field strength, and thus tension on the elastic member 22, would be proportional to the current driven through the coil of the electromagnet.

In addition, the resonant frequency of the tunable energy harvester 10 may be altered by adjusting the proximity of a magnetic material to the proof-mass 24, thereby repelling or attracting the magnets 14 and changing the damping and effective spring constant of the elastic members 22. Heating the elastic members 22 from an external heat source or by running an electrical current through the elastic members 22 may also be used to alter the resonant frequency of the tunable energy harvester 10. In yet another embodiment, the resonant frequency tuner 18 may be conductive material that is adjustably positioned between or around the flux gap 20 such that when the conductive material is exposed to the changing magnetic flux lines, eddy currents are induced in the conductive material thereby changing the damping, and thus the resonant frequency of the tunable energy harvester 10.

From the above description of the tunable energy harvester 10, it is manifest that various techniques may be used for implementing the concepts of tunable energy harvester 10 without departing from its scope. The described embodiments are to be considered in all respects as illustrative and not restrictive. It should also be understood that tunable energy harvester 10 is not limited to the particular embodiments described herein, but is capable of many embodiments without departing from the scope of the claims.

We claim:

1. An energy harvester comprising:
a substrate;
two magnets coupled to the substrate in close proximity to each other with like magnetic poles facing each other creating a flux gap;
a coil coupled to the substrate and disposed within the flux gap, wherein the coil and the magnets are coupled to the substrate such that substrate acceleration causes relative elastic motion between the magnets and the coil thereby exposing the coil to a changing magnetic flux;
a proof mass elastically coupled to the substrate via elastic members, wherein the coil is coupled to the proof mass and the proof mass is elastically coupled to the substrate and wherein the magnets are rigidly coupled to the substrate, wherein the proof mass comprises top and bottom surfaces with top and bottom recesses respectively therein, and the coil comprises top and bottom coils, both coils being wound in the same direction, and wherein the top and bottom coils are mounted in the top and bottom recesses respectively so that both the top and bottom coils are positioned approximately in a null of a magnetic field gradient created by the magnets;
a resonant frequency tuner coupled to the substrate and configured to adjust the resonant frequency between the coil and the magnets; and
a force feedback system operatively coupled to the resonant frequency tuner and an output of the top and bottom coils, wherein the force feedback system is configured to monitor the output of the top and bottom coils and adjust the tension in the elastic members via the resonant frequency tuner in real time such that at any given vibration frequency of the substrate, the proof mass vibrates at a resonant frequency with respect to the magnets.

2. The energy harvester of claim 1, wherein the resonant frequency tuner comprises a hermetically-sealed enclosure filled with a gas and further comprises a gas pressure adjuster, wherein the coil and the magnets are enclosed in the enclosure.

3. The energy harvester of claim 1, wherein the resonant frequency tuner is a tunable load-matching circuit, wherein the load-matching circuit is configured to change an electrical load external to the coil by tuning the impedance of the load-matching circuit.

4. The energy harvester of claim 1, wherein the resonant frequency tuner is a circuit comprising a switch, wherein the circuit is configured to switch connection to and from the coil with a given duty cycle, thereby altering the resonant frequency of the energy harvester.

5. The energy harvester of claim 1, wherein the resonant frequency tuner is configured to alter the mass of the proof mass.

6. The energy harvester of claim 1, wherein the elastic members are made of a magnetic material and the resonant frequency tuner comprises a permanent magnet that is adjustably coupled to the substrate such that the position of the permanent magnet with respect to at least one of the elastic members is adjustable.

7. The energy harvester of claim 1, wherein the elastic members are springs and the resonant frequency tuner is a mechanical spring-tension adjuster operatively coupled to the springs.

8. The energy harvester of claim 1, wherein the resonant frequency tuner is configured to alter the spring constant of the elastic members by effectively altering the length of the elastic members.

9. The MEMS energy harvester of claim 1, wherein the elastic member is a compliant region of the substrate.

10. The MEMS energy harvester of claim 9, wherein the resonant frequency tuner comprises an electrode integrated into the substrate near the elastic member such that when a potential is applied between the elastic member and the electrode an electrostatic force is created which alters the tension of the elastic member.

11. The MEMS energy harvester of claim 10, wherein the elastic member forms a cantilevered beam with the proof mass supported at the end thereof.

12. The MEMS energy harvester of claim 9, wherein the substrate forms a hermetically-sealed enclosure containing the coil and the magnets, and wherein the enclosure is filled with a gas, and wherein the resonant frequency tuner comprises a gas pressure adjuster.

13. A micro-electro mechanical system (MEMS) energy harvesting apparatus comprising:
- a substrate;
- two magnets, each magnet having an opposing face, wherein the magnets are rigidly coupled to the substrate such that the opposing faces are substantially parallel to each other with like magnetic poles facing each other with a space there-between so as to form a steep flux gradient region in and around the space between the opposing faces;
- an elastic member having first and second ends, wherein the second end is coupled to the substrate;
- a proof mass coupled to the first end of the elastic member such that the proof mass is positioned within the steep flux gradient region and is configured to move with respect to the magnets responsive to substrate acceleration;
- a coil coupled to the proof mass so that the coil is exposed to a changing magnetic flux arising from motion of the proof mass with respect to the magnets; and
- a resonant frequency tuner operatively coupled to the elastic member; and
- a force feedback system operatively coupled to the resonant frequency tuner and an output of the coil, wherein the force feedback system is configured to monitor the output of the coil and adjust the tension in the elastic member via the resonant frequency tuner in real time such that at any given vibration frequency of the substrate, the proof mass vibrates at a resonant frequency with respect to the magnets.

* * * * *